(12) United States Patent
Tseng et al.

(10) Patent No.: US 8,724,061 B2
(45) Date of Patent: May 13, 2014

(54) PIXEL STRUCTURE

(75) Inventors: Wen-Hsien Tseng, Taichung (TW);
Sheng-Ju Ho, Hsinchu (TW); Yen-Heng Huang, Taoyuan County (TW);
Cheng-Han Tsao, New Taipei (TW);
Chia-Hui Pai, Taichung (TW);
Chung-Kai Chen, Taichung (TW);
Wei-Yuan Cheng, Taichung (TW);
Yi-Jen Huang, Kaohsiung (TW);
Chung-Yi Chiu, Tainan (TW);
Kung-Ching Chu, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 392 days.

(21) Appl. No.: 13/034,680

(22) Filed: Feb. 24, 2011

(65) Prior Publication Data

US 2012/0138963 A1    Jun. 7, 2012

(30) Foreign Application Priority Data

Dec. 7, 2010    (TW) .............................. 99142587 A

(51) Int. Cl.
*G02F 1/1337*    (2006.01)

(52) U.S. Cl.
USPC .......................................... 349/129; 349/130

(58) Field of Classification Search
None
See application file for complete search history.

(56) References Cited

U.S. PATENT DOCUMENTS

| | | | |
|---|---|---|---|
| 2003/0137628 A1* | 7/2003 | Nagaoka | 349/141 |
| 2005/0078255 A1* | 4/2005 | Hiroshi | 349/141 |
| 2008/0007681 A1* | 1/2008 | Chen et al. | 349/129 |
| 2008/0036355 A1* | 2/2008 | Chan et al. | 313/326 |
| 2008/0074600 A1 | 3/2008 | Hsu et al. | |
| 2009/0168003 A1* | 7/2009 | Liu et al. | 349/129 |

* cited by examiner

*Primary Examiner* — Thanh-Nhan P Nguyen
(74) *Attorney, Agent, or Firm* — Jianq Chyun IP Office

(57) ABSTRACT

A pixel structure includes a substrate, a scan line, a first data line, a second data line, a first active device, a second active device, a first pixel electrode, and a second pixel electrode. The substrate has a first unit area and a second unit area. The first pixel electrode is disposed in the first unit area and includes a first main portion and first branch portions extending from the first main portion to an edge of the first unit area. The second pixel electrode is disposed in the second unit area and includes a second main portion and second branch portions extending from the second main portion to an edge of the second unit area, wherein at least a part of the first branch portions and at least a part of the second branch portions are asymmetrically arranged at two sides of the second data line.

16 Claims, 7 Drawing Sheets

PIXEL STRUCTURE

CROSS-REFERENCE TO RELATED APPLICATION

This application claims the priority benefit of Taiwan application serial no. 99142587, filed Dec. 7, 2010. The entirety of the above-mentioned patent application is hereby incorporated by reference herein and made a part of this specification.

BACKGROUND OF THE INVENTION

1. Field of the Invention

The invention relates to a pixel structure and particularly relates to a pixel structure adapted for display panel.

2. Description of Related Art

As display technology develops and thrives, consumers now have higher standard and demand for the quality of displays. In addition to the resolution, color saturation, and response time of displays, contrast ratio has also become an important factor to the consumers.

Therefore, manufacturers in the display industries have developed polymer-stabled alignment (PSA) display panels for the purpose of improving contrast ratio. However, in the conventional PSA display panel, the problem of disclination line may easily occur around the middle of the pixel electrode, which results in the reduction of contrast ratio and transmittance of the display panels.

Further, in order to improve the transmittance of the PSA display panel, some manufacturers apply the technique of black matrix on array (BOA) to the PSA display panel. However, limited by lithographic process, the shortest distance between two adjacent pixel electrodes needs to be greater than a fabrication limit value (8 micrometers, for example). As a result, the width of the black matrix (data line, for example) between the adjacent two pixel electrodes cannot be further reduced. For this reason, the transmittance of the PSA display panel cannot be improved. In view of the above, how to design PSA display panels to provide higher transmittance and prevent disclination line has become a goal to the researchers in this field.

SUMMARY OF THE INVENTION

The invention provides a pixel structure, and a display panel with the pixel structure disposed therein has higher transmittance.

The invention further provides a pixel structure, which reduces the occurrence of disclination line in a display panel and increases the transmittance of the display panel.

The invention provides a pixel structure, including a substrate, a scan line, a first data line, a second data line, a first active device, a second active device, a first pixel electrode, and a second pixel electrode. The substrate has a first unit area and a second unit area. The scan line, the first data line, and the second data line are disposed on the substrate. The first active device is electrically connected with the scan line and the first data line. The second active device is electrically connected with the scan line and the second data line. The first pixel electrode is disposed in the first unit area and electrically connected with the first active device, wherein the first pixel electrode includes a first main portion and a plurality of first branch portions, and the first branch portions extend from the first main portion to an edge of the first unit area. The second pixel electrode is disposed in the second unit area and electrically connected with the second active device, wherein the second pixel electrode includes a second main portion and a plurality of second branch portions, and the second branch portions extend from the second main portion to an edge of the second unit area, wherein at least a part of the first branch portions and at least a part of the second branch portions are asymmetrically arranged on two sides of the second data line.

The invention provides a pixel structure, including a substrate, a scan line, a data line, an active device, and a pixel electrode. The substrate has a unit area. The scan line and the data line are disposed on the substrate. The active device is electrically connected with the scan line and the data line. The pixel electrode is disposed in the unit area and electrically connected with the active device, wherein the pixel electrode includes a main portion and a plurality of branch portions. The branch portions of the pixel electrode extend from the main portion to an edge of the unit area, wherein at least a part of the branch portions are asymmetrically arranged on two sides of the main portion.

According to the above descriptions of the pixel structure of the invention, the first branch portions and the second branch portions are asymmetrically arranged on two sides of the second data line, so that the first branch portions and the second branch portions can be closer to each other. Accordingly, the width of the second data line is reduced to further increase the transmittance of the display panel with the pixel structure disposed therein.

In addition, according to another pixel structure of the invention, the branch portions are asymmetrically arranged on two sides of the main portion, so as to reduce the occurrence of disclination line around the main portion.

In order to make the aforementioned and other features and advantages of the invention more comprehensible, several embodiments accompanied with figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

First Embodiment

Figure 1A:
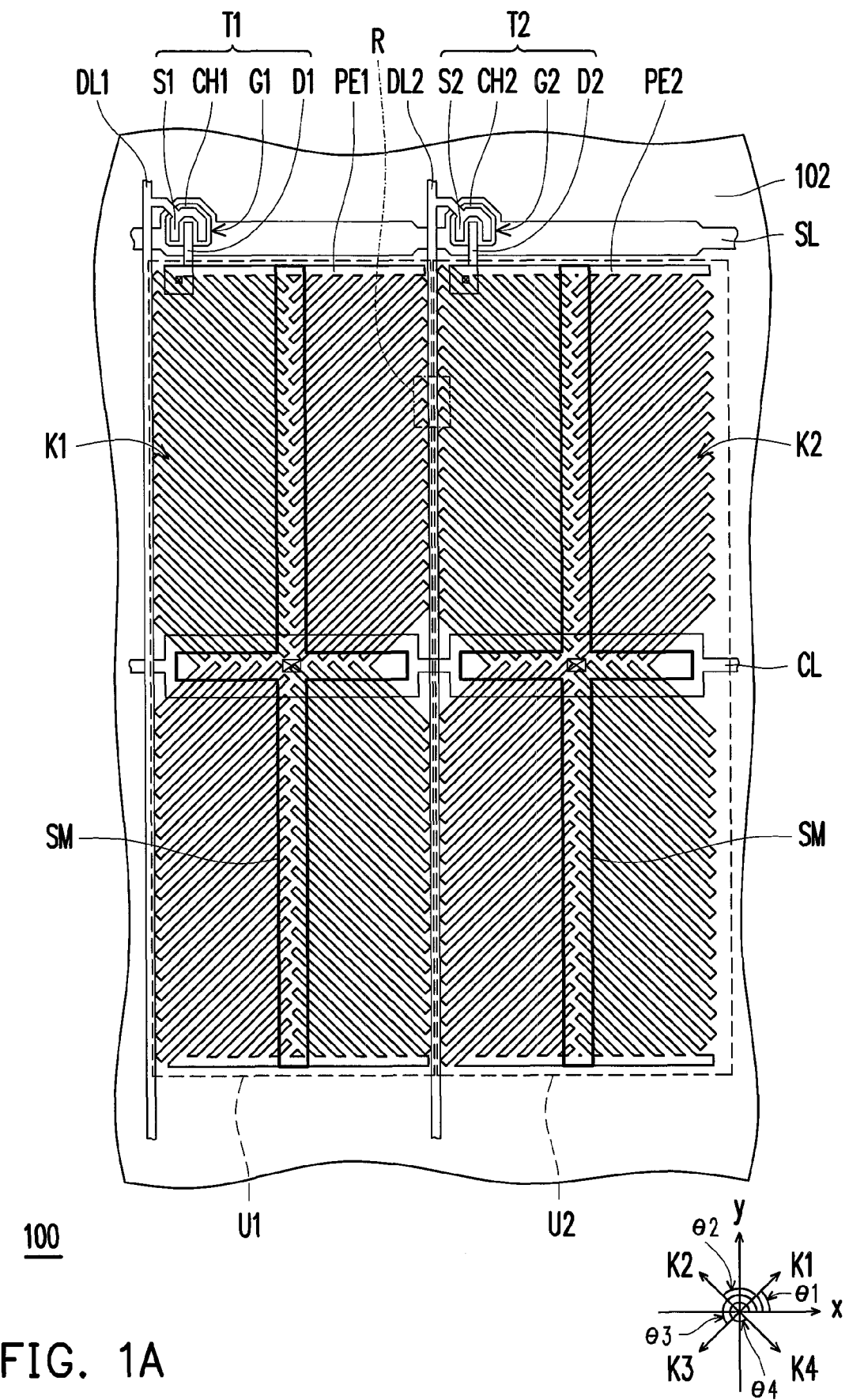
FIG. 1A is a schematic top view of a pixel structure according to the first embodiment of the invention.
Figure 1B:
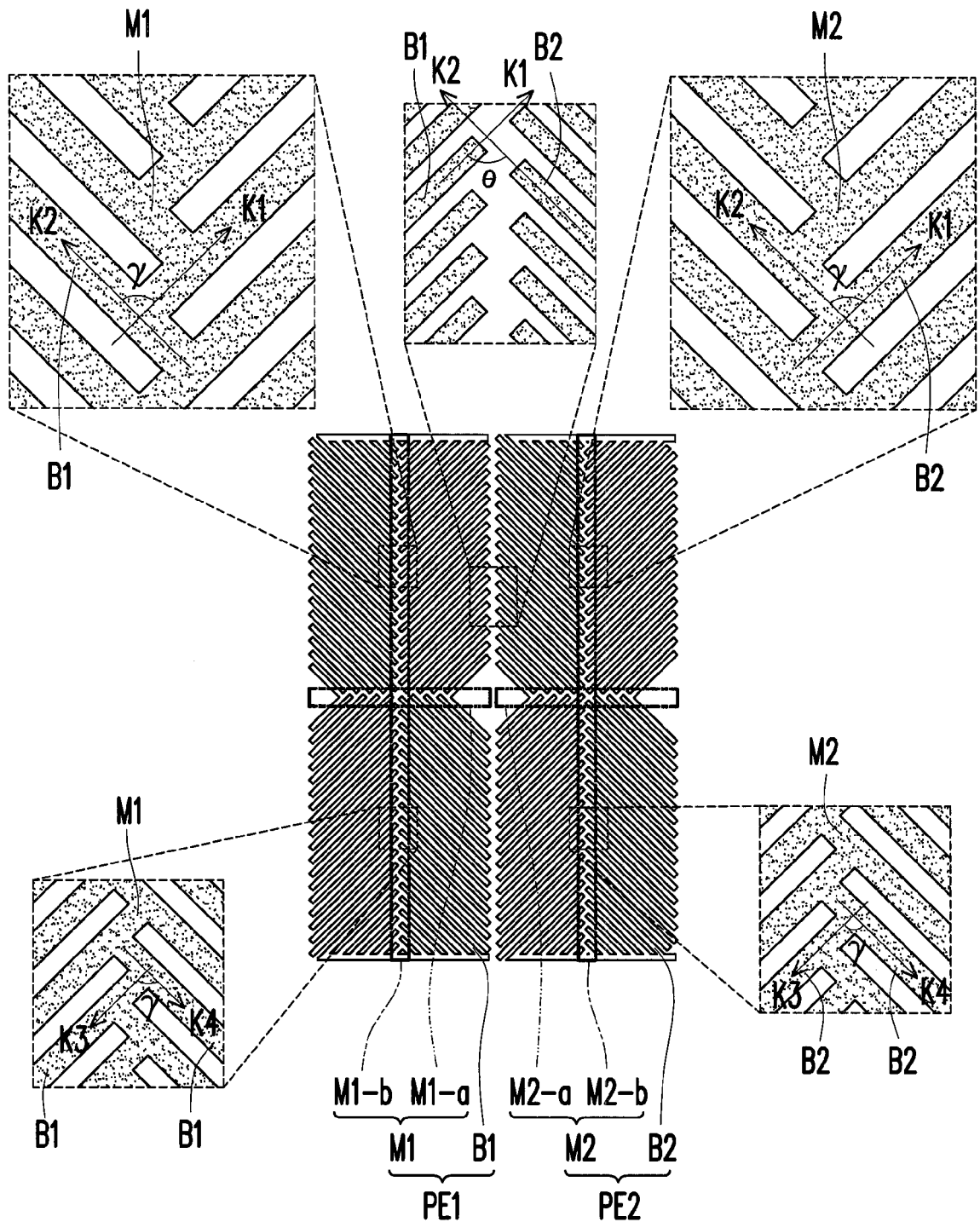
FIG. 1B is a schematic top view of a pixel electrode according to the first embodiment of the invention.

FIG. 1A is a schematic top view of a pixel structure 100 according to an embodiment of the invention. FIG. 1B illustrates top views of a first pixel electrode PE1 and a second pixel electrode PE2 in FIG. 1A. With reference to FIGS. 1A and 1B, the pixel structure 100 includes a substrate 102, a scan line SL, a first data line DL1, a second data line DL2, a first active device T1, a second active device T2, the first pixel electrode PE1, and the second pixel electrode PE2.

The substrate 102 has a first unit area U1 and a second unit area U2. In this embodiment, a material of the substrate 102 is glass, quartz, organic polymer, opaque/reflective material (such as conductive material, wafer, ceramics, or the like), or other suitable materials.

The scan line SL, the first data line DL1, and the second data line DL2 are disposed on the substrate 102. In this embodiment, the scan line SL is disposed to interlace with the first data line DL1 and the second data line DL2. In other words, extending directions of the first data line DL1 and the second data line DL2 are not parallel to an extending direction of the scan line SL. Preferably, the extending directions of the first data line DL1 and the second data line DL2 are perpendicular to the extending direction of the scan line SL. Moreover, the first data line DL1 and the second data line DL2 are formed in the same layer, but the scan line SL is formed in a different layer. In consideration of electrical conductivity, the scan line SL, the first data line DL1, and the second data line DL2 are made of metallic materials generally. However, the invention is not limited thereto. According to other embodiments of the invention, the scan line SL, the first data line DL1, and the second data line DL2 can also be made of other conductive materials, such as an alloy, a metal nitride material, a metal oxide material, a metal oxynitride material, or stacked layers of metal materials or other conductive materials.

The first active device T1 is electrically connected with the scan line SL and the first data line DL1. Specifically, the first active device T1 includes a gate G1, a channel CH1, a source S1, and a drain D1. In this embodiment, a partial area of the scan line SL serves as the gate G1. The channel CH1 is located above the gate G1. A partial extending area of the first data line DL1 serves as the source S1. The source S1 and the drain D1 are disposed above the channel CH1. The first active device T1 is a bottom-gate thin film transistor (TFT), for example; however, the invention is not limited thereto. According to other embodiments, the first active device T1 can also be a top-gate TFT. According to the embodiment, an insulating layer (not shown) is further formed on the gate G1 of the first active device T1, which is referred to as a gate insulating layer. In addition, another insulating layer (not shown) can be further formed on the first active device T1, which is referred to as a passivation layer. A material of the aforesaid insulating layers is an inorganic material (e.g. silicon oxide, silicon nitride, silicon oxynitride, or stacked layers of at least two of the foregoing materials), an organic material, or a combination of the foregoing.

The second active device T2 is electrically connected with the scan line SL and the second data line DL2. The second active device T2 includes a gate G2, a channel CH2, a source S2, and a drain D2. In this embodiment, a partial area of the scan line SL serves as the gate G2. The channel CH2 is located above the gate G2. A partial extending area of the second data line DL2 serves as the source S2. The source S2 and the drain D2 are located above the channel CH2. Likewise, the second active device T2 is a bottom-gate thin film transistor (TFT), for example; however, the invention is not limited thereto. According to other embodiments, the second active device T2 can also be a top-gate TFT. An insulating layer (not shown) is further formed on the gate G2 of the second active device T2, which is referred to as a gate insulating layer. In addition, another insulating layer (not shown) can be further formed on the second active device T2, which is referred to as a passivation layer.

The first pixel electrode PE1 is disposed in the first unit area U1 and electrically connected with the first active device T1, wherein the first pixel electrode PE1 includes a first main portion M1 and a plurality of first branch portions B1, and the first branch portions B1 extend from the first main portion M1 to an edge of the first unit area U1. Specifically, the first branch portions B1 are connected with the first main portion M1, and the first branch portions B1 extend from the first main portion M1 to the edge of the first unit area U1 along four directions K1, K2, K3, and K4. To be more detailed, if the extending direction of the scan line SL is an x direction and the extending direction of the first data line DL1 (or the second data line DL2) is a y direction, an included angle between the x direction and the K1 direction is θ1, which can be 30~60 degrees; an included angle between the x direction and the K2 direction is θ2, which can be 120~150 degrees; an included angle between the x direction and the K3 direction is θ3, which can be 210~240 degrees; and an included angle between the x direction and the K4 direction is θ4, which can be 300~330 degrees.

It should be noted that, according to this design, a display medium (e.g. liquid crystal) on the first pixel electrode PE1 is arranged along four different directions. A display panel equipped with this type of pixel electrode can provide better viewing angle. Moreover, the extending directions K1 and K2 (or K3, K4) of the first branch portions B1 on two sides of the first main portion M1 interlace each other. An included angle between the extending directions K1 and K2 (or K3, K4) is γ, which is preferably 60~120 degrees. In this embodiment, the first pixel electrode PE1 is, for example, a transparent conductive layer, comprising a metal oxide, such as indium tin oxide (ITO), indium zinc oxide (IZO), aluminum tin oxide (ATO), aluminum zinc oxide (AZO), indium gallium zinc oxide (IGZO), other suitable oxides, or stacked layers of at least two of the foregoing materials.

In this embodiment, the first main portion M1 of the first pixel electrode PE1 includes a first horizontal portion M1-$a$ and a first vertical portion M1-$b$. Preferably, an extending direction of the first horizontal portion M1-$a$ is parallel to the scan line SL, and an extending direction of the first vertical portion M1-$b$ is parallel to the first and the second data lines DL1 and DL2. Two adjacent first branch portions B1 can have a first slit K1 formed therebetween, also referred to as an alignment slit, which performs alignment function on the display medium (e.g. liquid crystal) above the slit.

It should be noted that the first branch portions B1 are asymmetrically arranged on two sides of the first horizontal portions M1-$a$ of the first main portion M1, and the first branch portions B1 are asymmetrically arranged on two sides of the first vertical portions M1-$b$ of the first main portion M1 as well. That is to say, the first branch portions B1 are staggeredly arranged on two sides of the first horizontal portions M1-$a$ of the first main portion M1, and the first branch portions B1 are staggeredly arranged on two sides of the first vertical portions M1-$b$ of the first main portion M1 as well. Therefore, the first horizontal portion M1-$a$ and the first vertical portion M1-$b$ of the first main portion M1 respectively have a zigzag pattern (not a straight-line pattern). It should be noted that this design can control the display medium (e.g. liquid crystal) around the first horizontal portion M1-$a$ and the first vertical portion M1-$b$ to tilt more consistently, which reduces the occurrence of disclination line around the first main portion M1.

The second pixel electrode PE2 is disposed in the second unit area U2 and electrically connected with the second active device T2, wherein the second pixel electrode PE2 includes a second main portion M2 and a plurality of second branch portions B2, and the second branch portions B2 extend from the second main portion M2 to an edge of the second unit area U2. Specifically, the second branch portions B2 are connected with the second main portion M2, and the second branch portions B2 extend from the second main portion M2 to the edge of the second unit area U2 along four directions. According to this design, a display medium (e.g. liquid crystal) on the second pixel electrode PE2 is arranged along four different directions. A display panel equipped with this type of pixel electrode can provide better viewing angle. Moreover, the extending directions K1 and K2 (or K3, K4) of the second branch portions B2 on two sides of the second main portion M2 interlace each other. The included angle between the extending directions K1 and K2 (or K3, K4) is y, which is preferably 60~120 degrees. In this embodiment, the second pixel electrode PE2 is, for example, a transparent conductive layer, comprising a metal oxide, such as indium tin oxide (ITO), indium zinc oxide (IZO), aluminum tin oxide (ATO), aluminum zinc oxide (AZO), indium gallium zinc oxide (IGZO), other suitable oxides, or stacked layers of at least two of the foregoing.

In this embodiment, the second main portion M2 of the second pixel electrode PE2 includes a second horizontal portion M2-a and a second vertical portion M2-b. Preferably, an extending direction of the second horizontal portion M2-a is parallel to the scan line SL, and an extending direction of the second vertical portion M2-b is parallel to the first and the second data lines DL1 and DL2. Furthermore, two adjacent second branch portions B2 can have a second slit K2 formed therebetween, also referred to as an alignment slit, which performs alignment function on the display medium (e.g. liquid crystal) above the slit.

Similar to the above, the second branch portions B2 are asymmetrically arranged on two sides of the second horizontal portions M2-a of the second main portion M2, and the second branch portions B2 are asymmetrically arranged on two sides of the second vertical portions M2-b of the second main portion M2 as well. Accordingly, the second horizontal portion M2-a and the second vertical portion M2-b of the second main portion M2 respectively have a zigzag pattern (not a straight-line pattern). Because this design can control the display medium (e.g. liquid crystal) around the second horizontal portion M2-a and the second vertical portion M2-b to tilt more consistently, the occurrence of declination line around the second main portion M2 is reduced.

Figure 1C:
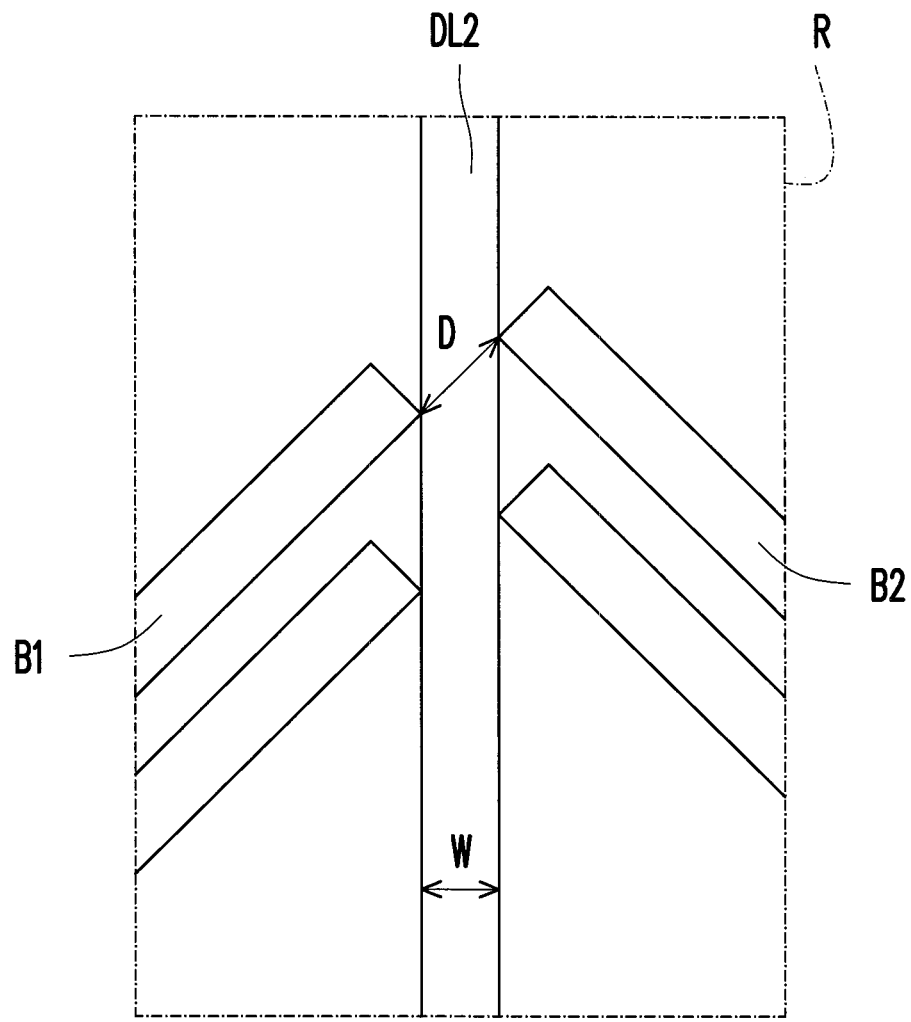
FIG. 1C is an enlarged view of Area R in FIG. 1A.

In the first pixel electrode PE1 and the second pixel electrode PE2 of this embodiment, the first branch portions B1 and the second branch portions B2 are asymmetrically arranged on two sides of the second data line DL2. That is, in the first pixel electrode PE1, an end of each of the first branch portions B1 is connected with the first main portion M1 and the first branch portions B1 are substantially asymmetrically arranged on two sides of the first main portion M1, i.e. being staggered on two sides of the first main portion M1; the other end of each of the first branch portions B1 is not connected with the first main portion M1. In the second pixel electrode PE2, an end of each of the second branch portions B2 is connected with the second main portion M2 and the second branch portions B2 are substantially asymmetrically arranged, i.e. being staggered on two sides of the second main portion M2; the other end of each of the second branch portions B2 is not connected with the second main portion M2. Therefore, the other ends of the first branch portions B1, not connected with the first main portion M1, on one side of the second data line DL2 are substantially asymmetrical to the other ends of the second branch portions B2, not connected with the second main portion M2, on the other side of the second data line DL2. To be more specific, FIG. 1C illustrates an enlarged view of a boundary area R between the first branch portions B1 and the second branch portions B2 in FIG. 1A. According to FIG. 1C, the first branch portions B1 and the second branch portions B2 are not symmetrical to each other and are staggered on two sides of the second data line DL2. When a shortest distance between the first branch portions B1 and the second branch portions B2 is fixed to a fabrication limit value D, the asymmetrical arrangement of the first branch portions B1 and the second branch portions B2 on two sides of the second data line DL2 can effectively reduce a width W of the second data line DL2 between the first branch portions B1 and the second branch portions B2. In other words, the area of the opaque second data line DL2 can be effectively reduced. As a consequence, the aperture ratio of the pixel structure 100 of this embodiment can be increased to further improve the transmittance of the display panel.

Moreover, in this embodiment, the first branch portions B1 on one side of the second data line DL2 are arranged symmetrically to at least a part of the second slits K2 on the other side of the second data line DL2, and at least a part of the first slits K1 on one side of the second data line DL2 are arranged symmetrically to at least a part of the second branch portions B2 on the other side of the second data line DL2, as shown in FIG. 1B. The extending direction K1 of the first branch portions B1 and the extending direction K2 of the second branch portions B2, disposed on two sides of the second data line DL2, have an included angle θ therebetween, which is preferably 60~120 degrees.

It should be noted that, in this embodiment, the first branch portions B1 and the second branch portions B2, positioned along the main portions and two sides of the second data line DL2, are all arranged asymmetrically, but the invention is not limited thereto. In other embodiments, only a part of the first branch portions B1 and only a part of the second branch portions B2 are asymmetrically arranged along the main portions and two sides of the second data line DL2. In other words, a part of the first branch portions B1 can be symmetrical to a part of the second branch portions B2, and the other first branch portions B1 and second branch portions B2 are arranged asymmetrically to one another.

According to this embodiment, the pixel structure 100 can further include a light-shielding pattern SM, which is disposed beneath the first main portion M1 and the second main portion M2. Specifically, the light-shielding pattern SM covers the first horizontal portion M1-a and the first vertical portion M1-b of the first main portion M1 (the second horizontal portion M2-a and the second vertical portion M2-b of the second main portion M2). That is, the light-shielding pattern SM is shaped like two crosses. In this embodiment, the light-shielding pattern SM, the first data line DL1, and the second data line DL2 can be disposed in the same layer or different layers. However, the invention is not limited thereto. According to other embodiments, the light-shielding pattern SM and the scan line SL can be formed on the same layer or different layers.

It should be noted that a main function of the light-shielding pattern SM is to prevent a display phenomenon, caused by the tilt of the display medium (e.g. liquid crystal) above the light-shielding pattern SM, from being seen by the viewer. Therefore, the display panel having the light-shielding pattern SM therein can provide better display quality. However, the use of the light-shielding pattern SM should be construed as a limitation to the invention. In other embodiments of the invention, the fabrication of the light-shielding pattern SM may be omitted. In addition, a part of the light-shielding pattern SM in the first horizontal portion M1-a of the first main portion M1 (the second horizontal portion M2-a of the second main portion M2) can serve as an electrode of a storage capacitor.

The pixel structure 100 can further comprise a common electrode line CL. In this embodiment, an extending direction of the common electrode line CL is parallel to the scan line SL. The common electrode line CL and the scan line SL can be formed in the same layer or different layers. According to this embodiment, the common electrode line CL is electrically connected to a common voltage. Because the common electrode line CL electrically couples with the first horizontal portion M1-a and the second horizontal portion M2-a respectively, electric charges of the first pixel electrode PE1 and the second pixel electrode PE2 can be stored therein to form two storage capacitors.

Second Embodiment

Figure 2A:
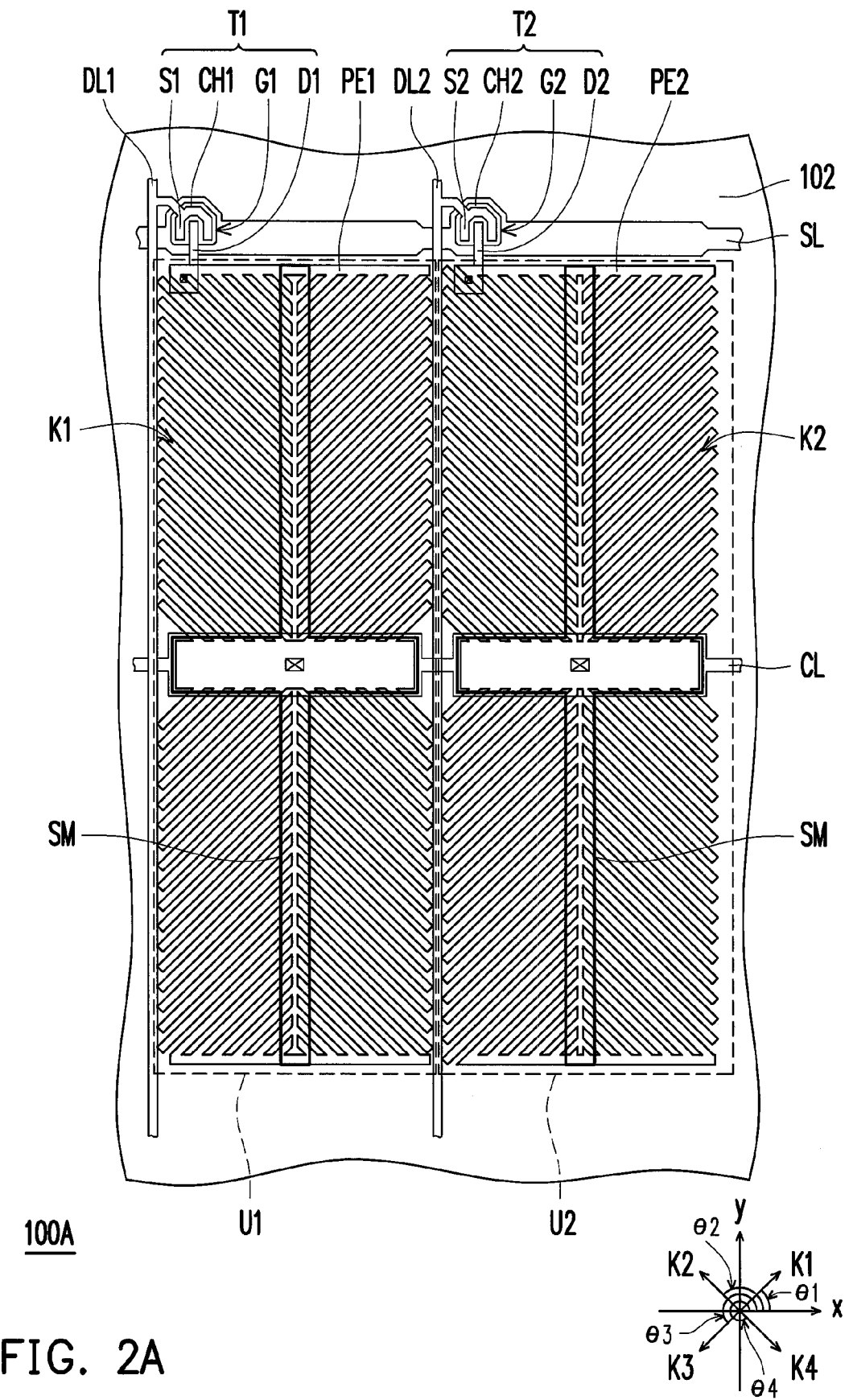
FIG. 2A is a schematic top view of a pixel structure according to the second embodiment of the invention.
Figure 2B:
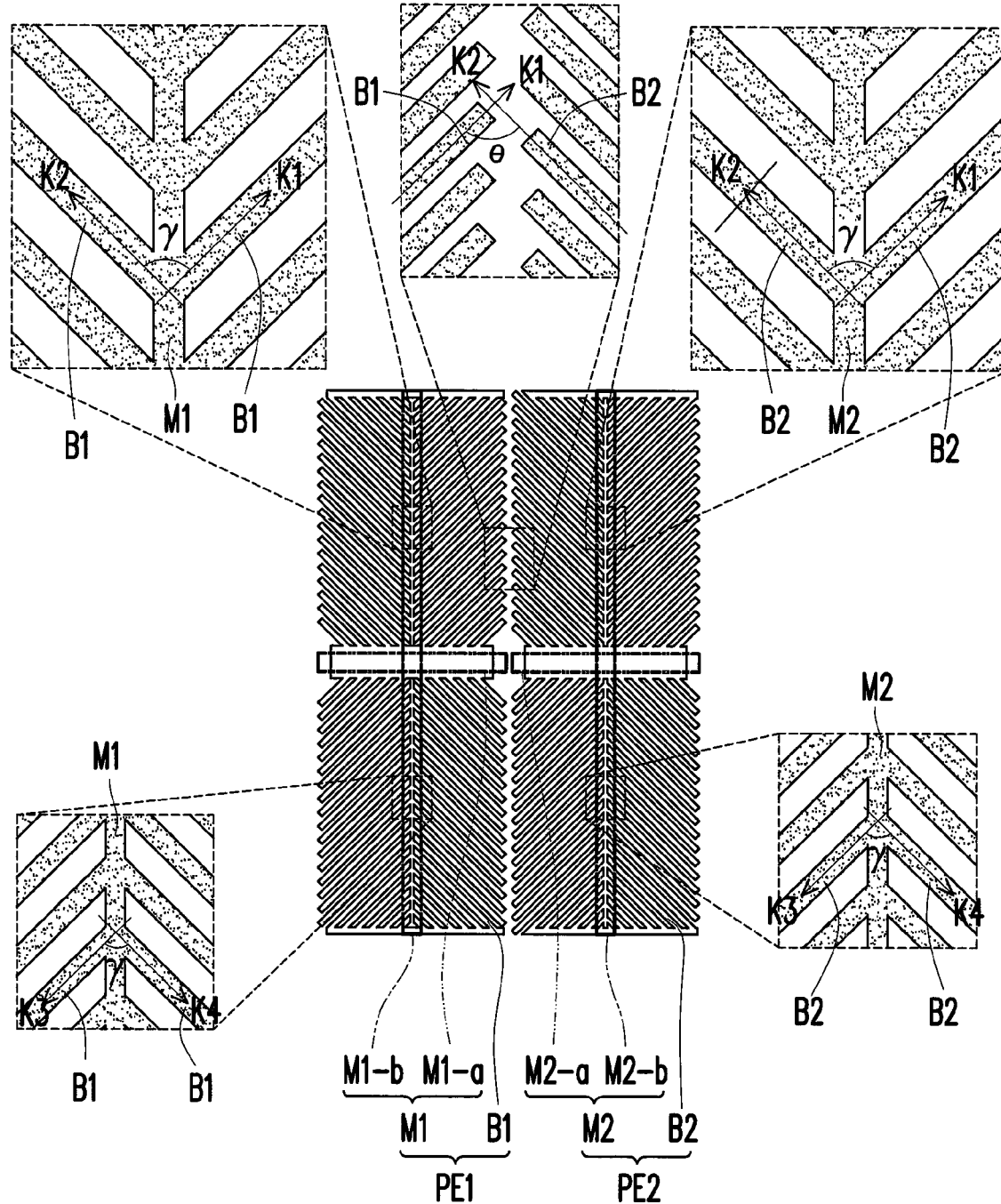
FIG. 2B is a schematic top view of a pixel electrode according to the second embodiment of the invention.

FIG. 2A is a schematic top view of a pixel structure 100A according to the second embodiment of the invention. FIG. 2B illustrates top views of the first pixel electrode PE1 and the second pixel electrode PE2 in FIG. 2A. With reference to FIGS. 2A and 2B, the pixel structure 100A of this embodiment is similar to the pixel structure 100 shown in FIG. 1A. Therefore, the same elements are referred to with the same reference numerals. The following paragraphs explain the differences between the pixel structure 100A and the pixel structure 100. What the pixel structure 100A and the pixel structure 100 have in common is therefore not reiterated hereinafter.

In this embodiment, the first horizontal portion M1-a and the second horizontal portion M2-a of the first main portion M1 and the first vertical portion M1-b and the second vertical portion M2-b of the second main portion M2 are all linear patterns. Thus, the first main portion M1 and the second main portion M2 of this embodiment are shaped like a cross respectively. Moreover, according to this embodiment, the first branch portions B1 are symmetrically arranged on two sides of the first horizontal portion M1-a and the first vertical portion M1-b of the first main portion M1. The second branch portions B2 are symmetrically arranged on two sides of the second horizontal portion M2-a and the second vertical portion M2-b of the second main portion M2 as well. It is worth mentioning that the extending directions K1 and K2 (or K3, K4) of the first branch portions B1 (the second branch portions B2) on two sides of the first main portion M1 (the second main portion M2) interlace each other. An included angle between the extending directions K1 and K2 (or K3, K4) is γ, which is preferably 60~120 degrees.

In the first pixel electrode PE1 and the second pixel electrode PE2 of this embodiment, the first branch portions B1 and the second branch portions B2 are asymmetrically arranged on two sides of the second data line DL2. Thus, the first branch portions B1 and the second branch portions B2 are staggered on two sides of the second data line DL2. According to this embodiment, the first branch portions B1 on one side of the second data line DL2 are arranged symmetrically to at least a part of the second slits K2 on the other side of the second data line DL2, and at least a part of the first slits K1 on one side of the second data line DL2 are arranged symmetrically to at least a part of the second branch portions B2 on the other side of the second data line DL2. In the first pixel electrode PE1, an end of each of the first branch portions B1 is connected with the first main portion M1 and the first branch portions B1 are substantially symmetrical to one another; the other end of each of the first branch portions B1 is not connected with the first main portion M1. In the second pixel electrode PE2, an end of each of the second branch portions B2 is connected with the second main portion M2 and the second branch portions B2 are substantially symmetrical to one another; the other end of each of the second branch portions B2 is not connected with the second main portion M2. In addition, the other ends of the first branch portions B1, not connected with the first main portion M1, on one side of the second data line DL2 are substantially asymmetrical to the other ends of the second branch portions B2, not connected with the second main portion M2, on the other side of the second data line DL2. In addition, the extending direction K1 of the first branch portions B1 and the extending direction K2 of the second branch portions B2, disposed on two sides of the second data line DL2, interlace each other and have an included angle θ therebetween, which is preferably 60~120 degrees.

It should be noted that, in this embodiment, the first branch portions B1 and the second branch portions B2 are all asymmetrically arranged along two sides of the second data line DL2, but the invention is not limited thereto. According to other embodiments of the invention, only a part of the first branch portions B1 and a part of the second branch portions B2 are asymmetrically arranged along two sides of the second data line DL2. In other words, a part of the first branch portions B1 can be symmetrical to a part of the second branch portions B2, while the other first branch portions B1 and second branch portions B2 are arranged asymmetrically to one another on two sides of the second data line DL2.

Third Embodiment

Figure 3A:
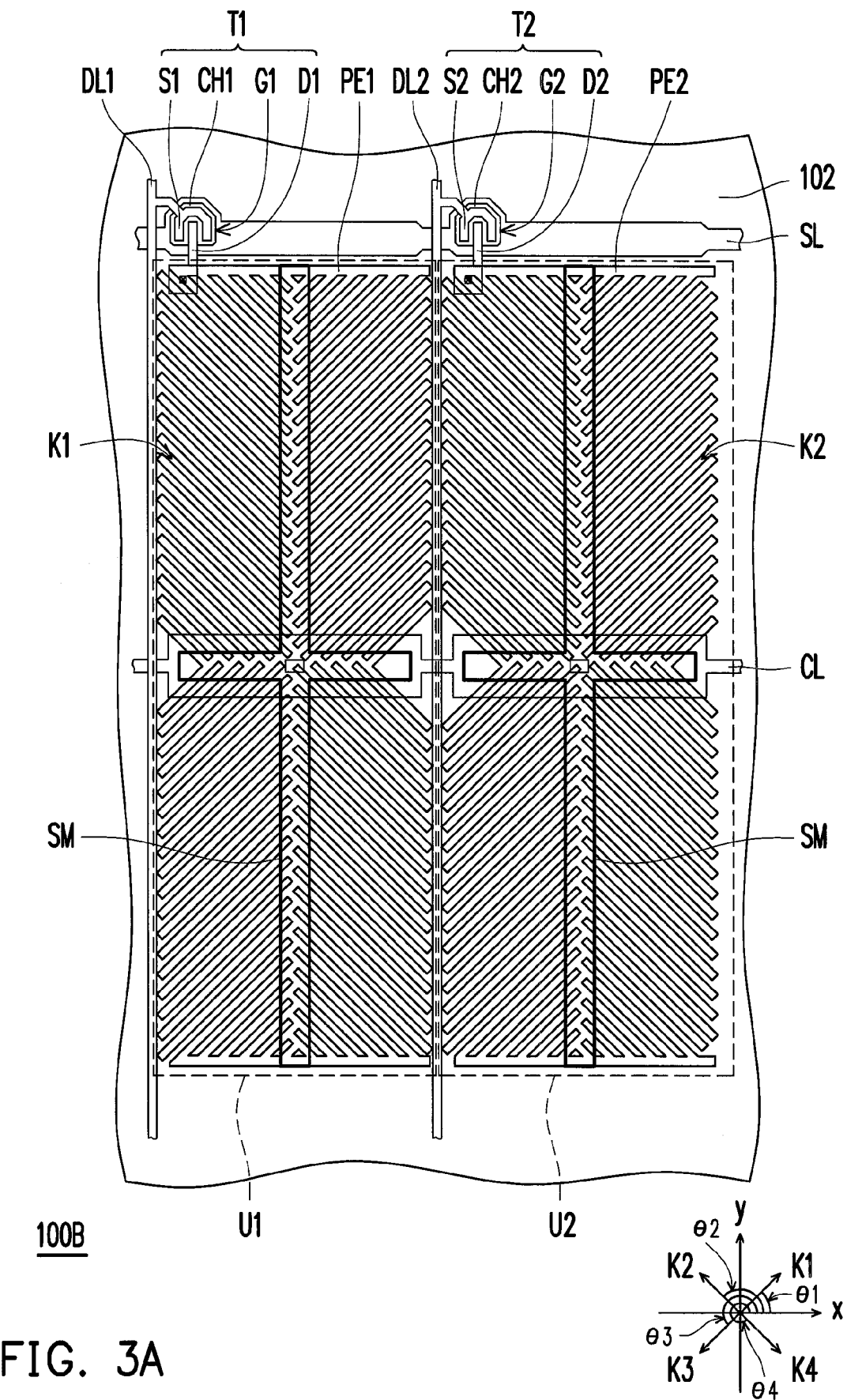
FIG. 3A is a schematic top view of a pixel structure according to the third embodiment of the invention.
Figure 3B:
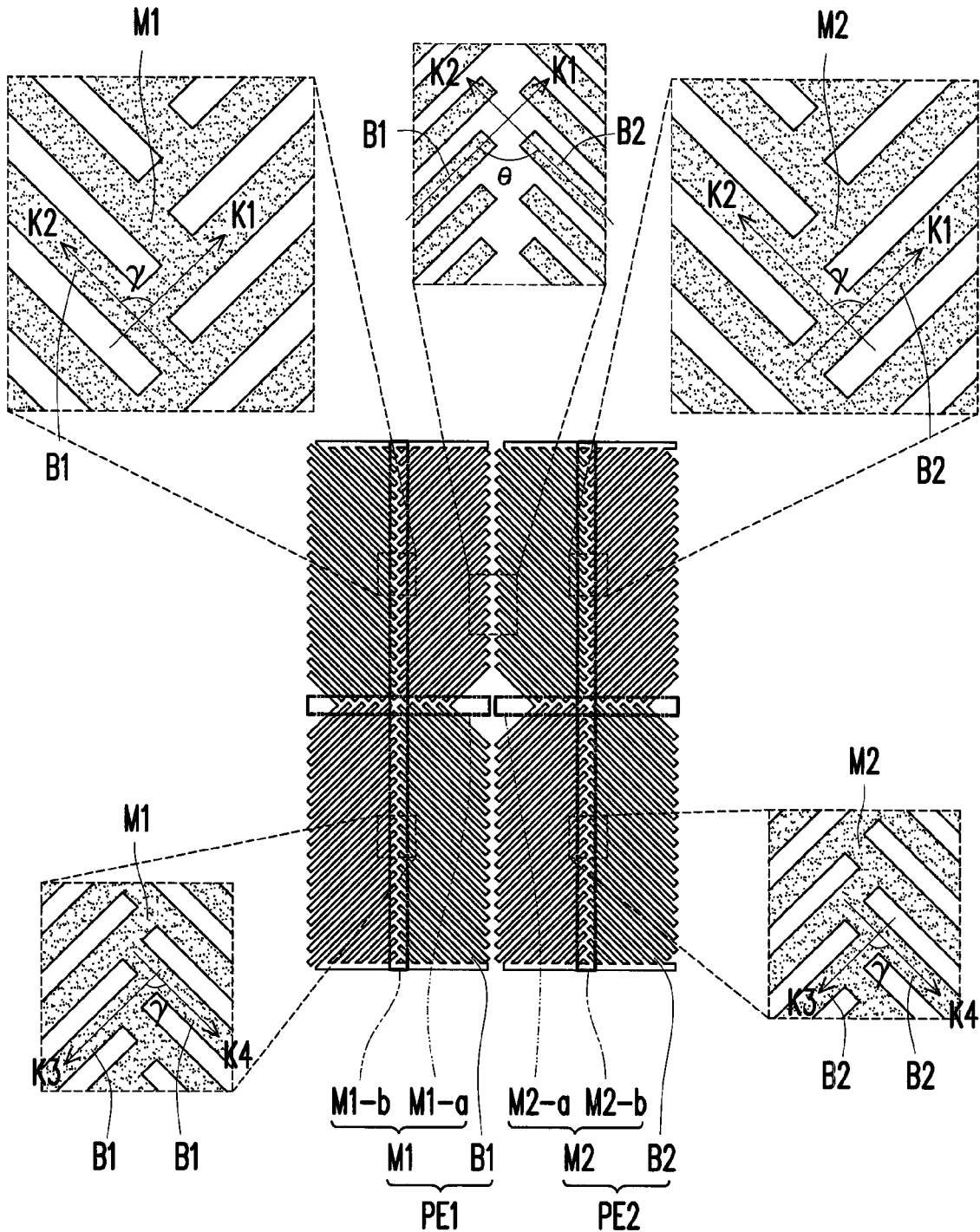
FIG. 3B is a schematic top view of a pixel electrode according to the third embodiment of the invention.

FIG. 3A is a schematic top view of a pixel structure 100B according to the third embodiment of the invention. FIG. 3B illustrates top views of the first pixel electrode PE1 and the second pixel electrode PE2 in FIG. 3A. With reference to FIGS. 3A and 3B, the pixel structure 100B of this embodiment is similar to the pixel structure 100 shown in FIG. 1A. Therefore, the same elements are referred to with the same reference numerals. The following paragraphs explain the differences between the pixel structure 100B and the pixel structure 100. What the pixel structure 100B and the pixel structure 100 have in common is therefore not reiterated hereinafter.

In this embodiment, the first branch portions B1 are asymmetrically arranged on two sides of the first horizontal portions M1-a of the first main portion M1, and the first branch portions B1 are asymmetrically arranged on two sides of the first vertical portions M1-b of the first main portion M1 as well. Therefore, the first horizontal portion M1-a and the first vertical portion M1-b of the first main portion M1 respectively have a zigzag pattern (not a straight-line pattern). Similarly, the second branch portions B2 are asymmetrically arranged on two sides of the second horizontal portions M2-a of the second main portion M2, and the second branch portions B2 are asymmetrically arranged on two sides of the second vertical portions M2-b of the second main portion M2 as well. Accordingly, the second horizontal portion M2-a and the second vertical portion M2-b of the second main portion M2 respectively have a zigzag pattern (not a straight-line pattern). Further to the above, the extending directions K1 and K2 (or K3, K4) of the first branch portions B1 on two sides of the first main portion M1 interlace each other. An included angle between the extending directions K1 and K2 (or K3, K4) is γ, which is preferably 60~120 degrees. Moreover, the extending directions K1 and K2 (or K3, K4) of the second branch portions B2 on two sides of the second main portion M2 interlace each other. The included angle between the extending directions K1 and K2 (or K3, K4) is γ, which is preferably 60~120 degrees.

In the first pixel electrode PE1 and the second pixel electrode PE2, the first branch portions B1 and the second branch portions B2 are symmetrically arranged on two sides of the second data line DL2. In other words, the first branch portions B1 of the first pixel electrode PE1 are symmetrical to the second branch portions B2 of the second pixel electrode PE2 along two sides of the second data line DL2. In the first pixel electrode PE1, an end of each of the first branch portions B1 is connected with the first main portion M1 and the first branch portions B1 are substantially asymmetrical to one another, i.e. being staggeredly arranged on two sides of the first main portion M1. In the second pixel electrode PE2, an end of each of the second branch portions B2 is connected with the second main portion M2 and the first branch portions B1 are substantially asymmetrical to one another, i.e. being staggeredly arranged on two sides of the first main portion M1. In addition, the other ends of the first branch portions B1, not connected with the first main portion M1, on one side of the second data line DL2 are substantially symmetrical to the other ends of the second branch portions B2, not connected with the second main portion M2, on the other side of the second data line DL2. Moreover, the extending direction K1 of the first branch portions B1 and the extending direction K2 of the second branch portions B2, disposed on two sides of the second data line DL2, interlace each other and have an included angle $\theta$ therebetween, which is preferably 60~120 degrees.

Likewise, in this embodiment, the first branch portions B1 and the second branch portions B2 are all asymmetrically arranged along the main portions, but the invention is not limited thereto. According to other embodiments of the invention, only a part of the first branch portions B1 and a part of the second branch portions B2 are asymmetrically arranged around the main portions. In other words, a part of the first branch portions B1 can be symmetrical to a part of the second branch portions B2 around the main portions, while the other first branch portions B1 and second branch portions B2 are asymmetrical to one another around the main portions.

To conclude, in the pixel structure of the invention, the first branch portions and the second branch portions are asymmetrically arranged along two sides of the second data line, so as to effectively reduce the width of the second data line, positioned between the first branch portions and the second branch portions. Consequently, the area of the second data line can be reduced to increase the aperture ratio of the pixel structure and further to improve the transmittance of the display panel equipped with the pixel structure.

Furthermore, in another pixel structure of the invention, the branch portions are asymmetrically arranged on two sides of the main portions, so as to reduce the occurrence of disclination line around the main portions.

What is claimed is:

1. A pixel structure, comprising:
   a substrate having a first unit area and a second unit area;
   a scan line disposed on the substrate;
   a first data line and a second data line disposed on the substrate;
   a first active device electrically connected with the scan line and the first data line;
   a second active device electrically connected with the scan line and the second data line;
   a first pixel electrode disposed in the first unit area and electrically connected with the first active device, wherein the first pixel electrode comprises a first main portion and a plurality of first branch portions, and the first branch portions extend from the first main portion to an edge of the first unit area, wherein any two adjacent first branch portions have a first slit therebetween; and
   a second pixel electrode disposed in the second unit area and electrically connected with the second active device, wherein the second pixel electrode comprises a second main portion and a plurality of second branch portions, and the second branch portions extend from the second main portion to an edge of the second unit area, wherein any two adjacent second branch portions have a second slit therebetween,
   wherein at least a part of the first branch portions and at least a part of the second branch portions are asymmetrically arranged on two sides of the second data line, wherein at least a part of the first branch portions on one side of the second data line are arranged symmetrically to at least a part of the second slits on the other side of the second data line, and at least a part of the first slits on one side of the second data line are arranged symmetrically to at least a part of the second branch portions on the other side of the second data line.

2. The pixel structure as claimed in claim 1, wherein an extending direction of the first branch portions arranged on one side of the second data line and an extending direction of the second branch portions arranged on the other side of the second data line interlace each other and form an included angle in a range of 60~120 degrees.

3. The pixel structure as claimed in claim 1, wherein the first main portion of the first pixel electrode comprises:
   a first horizontal portion having an extending direction parallel to the scan line; and
   a first vertical portion having an extending direction parallel to the first and the second data lines.

4. The pixel structure as claimed in claim 3, wherein the first branch portions are symmetrically arranged on two sides of the first horizontal portion and two sides of the first vertical portion of the first main portion.

5. The pixel structure as claimed in claim 4, wherein the first horizontal portion and the first vertical portion respectively have a linear pattern.

6. The pixel structure as claimed in claim 3, wherein the first branch portions are asymmetrically arranged on two sides of the first horizontal portion and two sides of the first vertical portion of the first main portion.

7. The pixel structure as claimed in claim 6, wherein the first horizontal portion and the first vertical portion respectively have a zigzag pattern.

8. The pixel structure as claimed in claim 1, wherein the second main portion of the second pixel electrode comprises:
   a second horizontal portion having an extending direction parallel to the scan line; and
   a second vertical portion having an extending direction parallel to the first and the second data lines.

9. The pixel structure as claimed in claim 8, wherein the second branch portions are symmetrically arranged on two sides of the second horizontal portion and two sides of the second vertical portion of the second main portion.

10. The pixel structure as claimed in claim 9, wherein the second horizontal portion and the second vertical portion respectively have a linear pattern.

11. The pixel structure as claimed in claim 8, wherein the second branch portions are asymmetrically arranged on two sides of the second horizontal portion and two sides of the second vertical portion of the second main portion.

12. The pixel structure as claimed in claim 11, wherein the second horizontal portion and the second vertical portion respectively have a zigzag pattern.

13. The pixel structure as claimed in claim 1, further comprising a light-shielding pattern disposed under the first main portion and the second main portion.

14. The pixel structure as claimed in claim 1, wherein the first branch portions extend from the first main portion to the edge of the first unit area along four directions, and the second branch portions extend from the second main portion to the edge of the second unit area along four directions.

15. The pixel structure as claimed in claim 14, wherein included angles between the four directions and an extending direction of the scan line are $\theta 1$, $\theta 2$, $\theta 3$, and $\theta 4$ respectively, wherein $30° \leq \theta 1 \leq 60°$, $120° \leq \theta 2 \leq 150°$, $210° \leq \theta 3 \leq 240°$, and $300° \leq \theta 4 \leq 330°$.

16. The pixel structure as claimed in claim 1, wherein the first branch portions and the first main portion are connected to each other, and the second branch portions and the second main portion are connected to each other.

* * * * *